INVENTOR
BARRY L. FROST
BY Robert H. Johnson
ATTORNEY

United States Patent Office 3,418,807
Patented Dec. 31, 1968

3,418,807
REMOTE CONTROL DEVICE
Barry L. Frost, Jackson, Mich., assignor to Clark Equipment Company, a corporation of Michigan
Filed Dec. 16, 1966, Ser. No. 602,279
2 Claims. (Cl. 60—54.5)

ABSTRACT OF THE DISCLOSURE

This invention relates to a remote control device and more specifically to a fluid type device suitable for use with a transmission which has an operator manipulated portion located remotely from the transmission.

---

Remote control fluid devices for shifting transmissions are not new. See, for example, U.S. Patent No. 2,014,195 which discloses such a device. However, heretofore such devices have not been used extensively, although there is a need for such a device in many truck applications because of the complex mechanical linkage that often is required between the truck cab and the transmission for shifting the transmission. The use of fluid type remote control devices for shifting transmissions has been limited because it is difficult to keep the master unit and the slave unit in synchronization due to internal fluid leakage past pistons in the device. When the master and slave units get out of synchronization with each other, then the whole device becomes inoperative. Therefore, it is a principal object of my invention to provide a device in which the master and slave units are automatically maintained in synchronism.

In carrying out my invention in a preferred embodiment thereof I provide a master control unit having at least two bores in each of which a piston is slidably disposed. The bores are interconnected with each other and with a fluid reservoir by means of a fluid passage. Each piston defines with its respective bore a chamber. Further, each piston has a port in the side thereof which is in fluid communication with the respective chamber by means of a fluid passage in the respective piston. The pistons are mechanically interconnected so that the ports in each of them simultaneously communicate with the fluid passage connecting the bores. My invention also includes a slave unit adapted to be mounted on the housing of a transmission. The slave unit includes at least one double-acting piston and cylinder type fluid motor which has a pair of chambers defined by the respective piston and cylinder. These chambers are connected to the chambers of the master unit by means of separate fluid conduits. Connected to the fluid motor is a selector which is releasably held in a given position by means of a detent mechanism.

Figure 1:
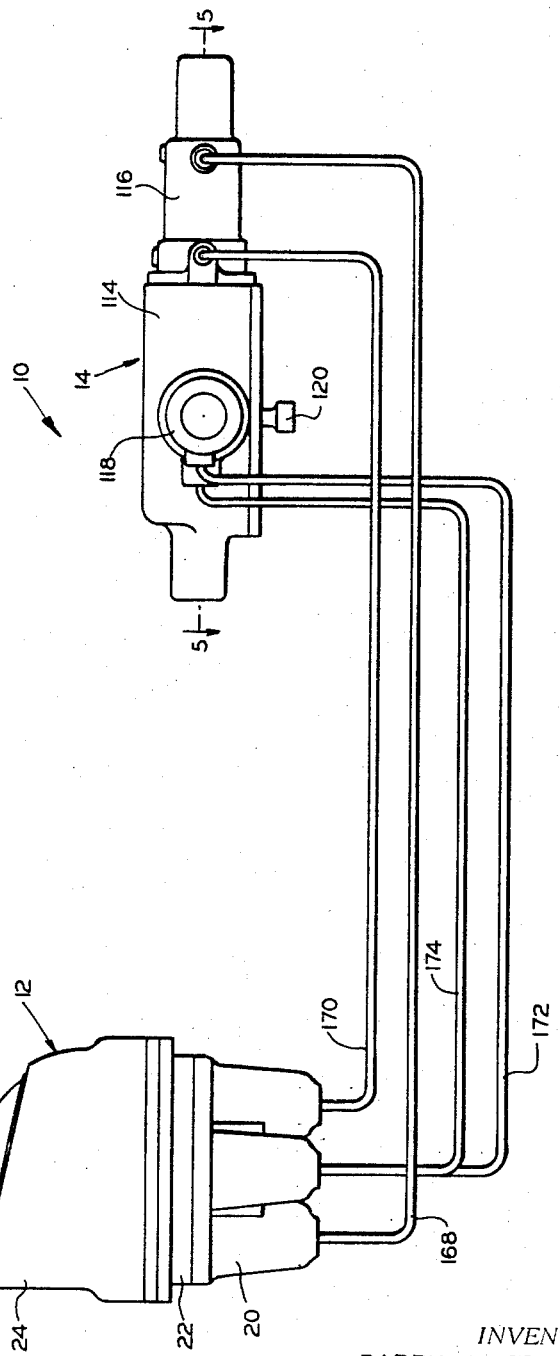
Figure 2:
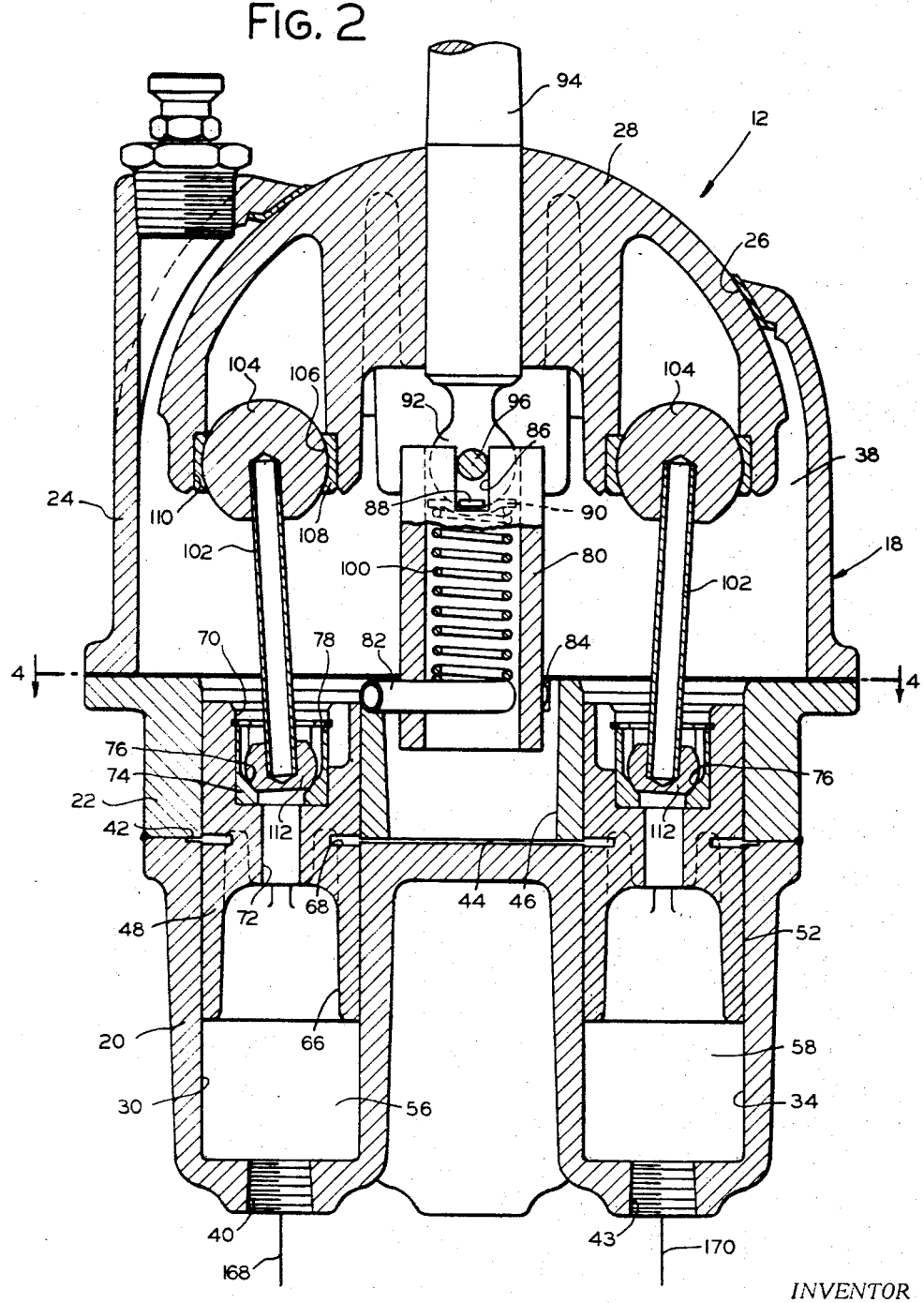
Figure 3:
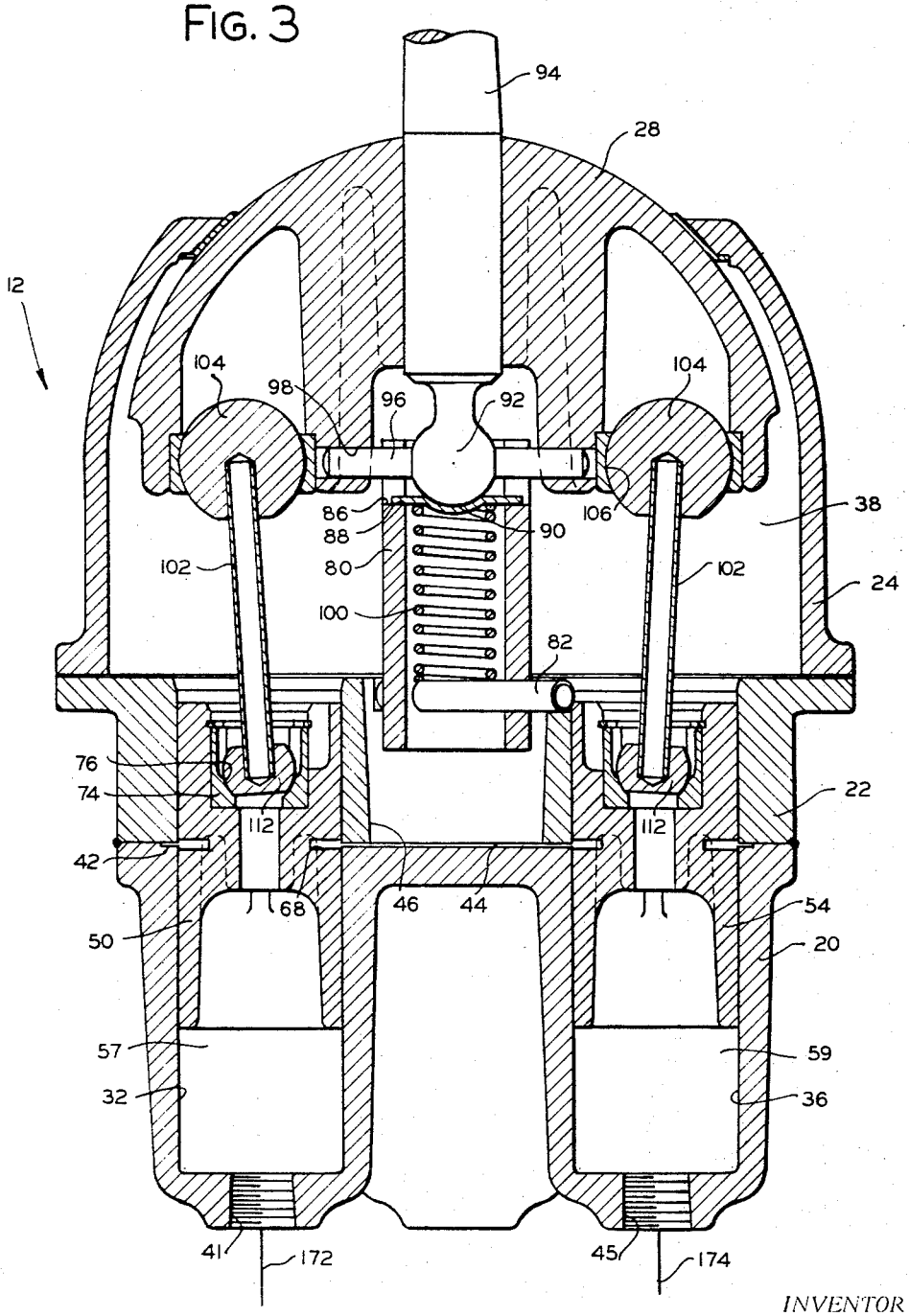
Figure 4:
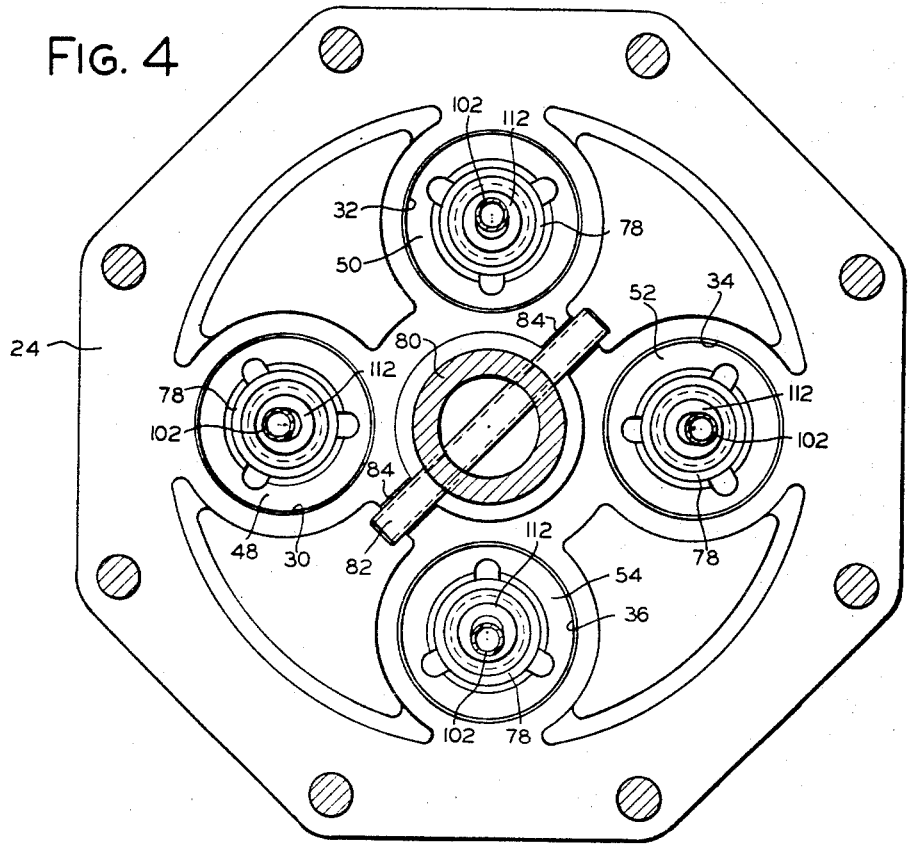
Figure 8:
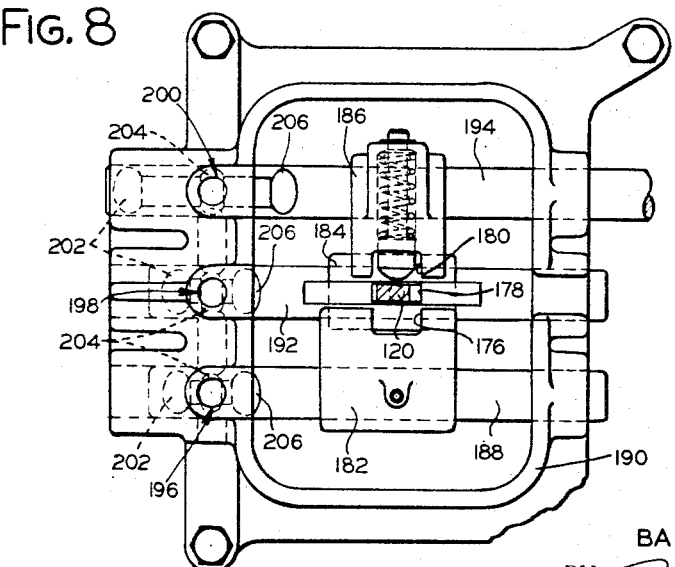
Figure 5:
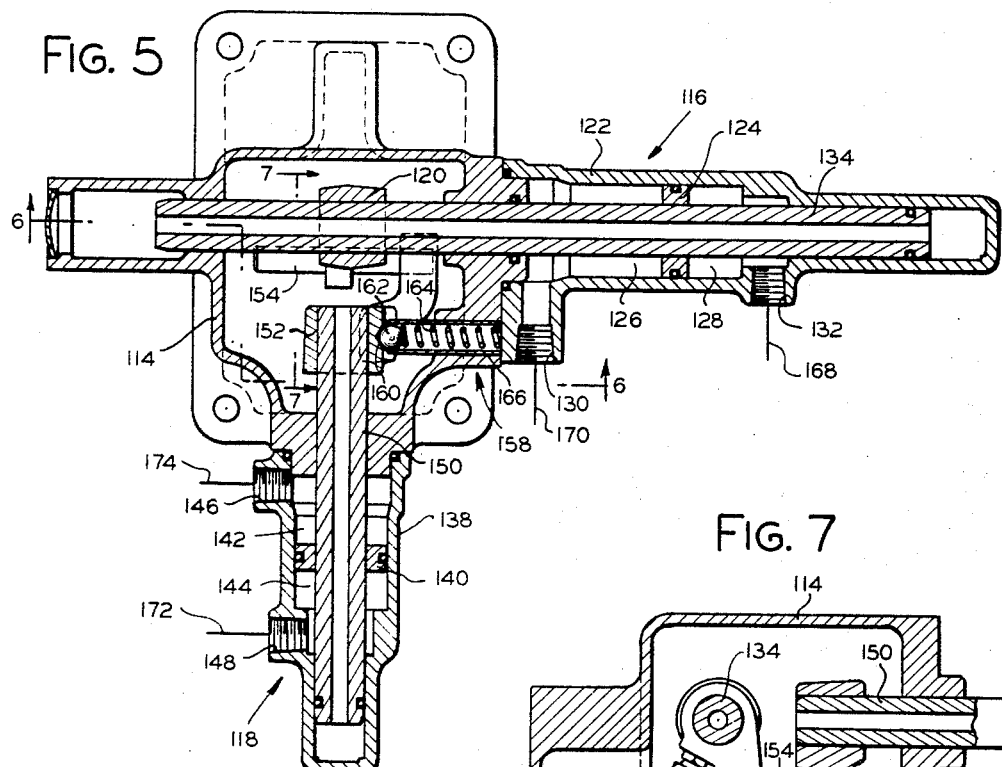
Figure 7:
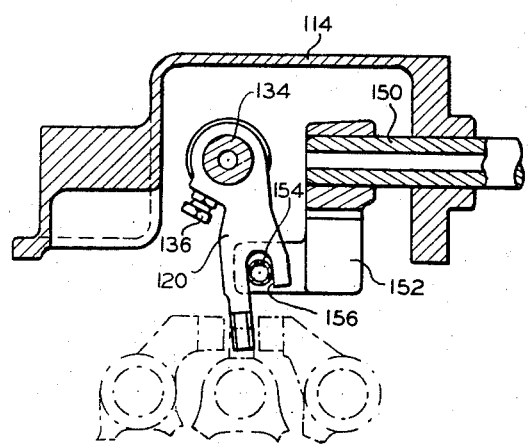
Figure 6:
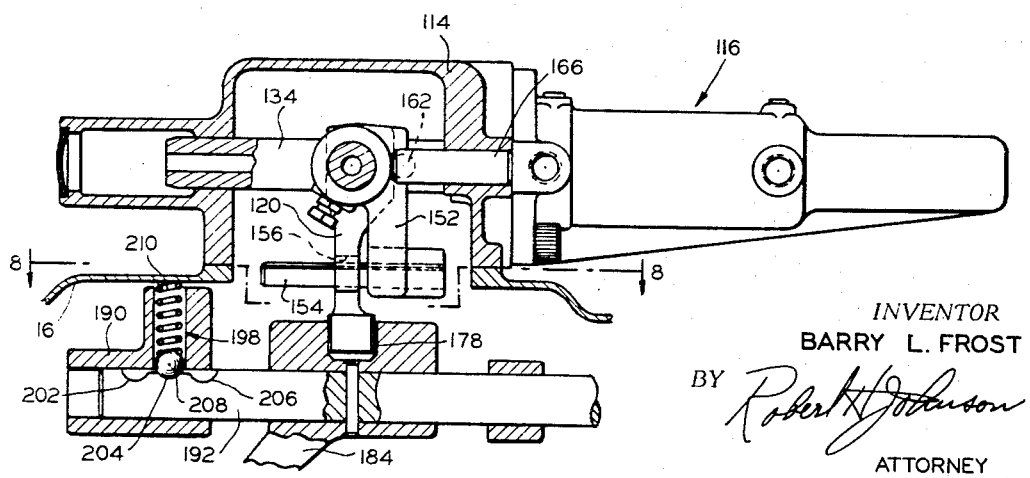

The above and other objects, features and advantages of my invention will be more readily apparent to persons skilled in the art when the following detailed description is taken in conjunction with the accompanying drawings wherein:

FIGURE 1 is a general view of my invention showing the connection of the master unit, FIGURE 2 is a vertical section of the master unit, FIGURE 3 is a vertical section taken 90° from the section shown in FIG. 2, FIGURE 4 is a cross-section taken along line 4—4 of FIG. 2, FIGURE 5 is a section taken along line 5—5 of FIG. 1, FIGURE 6 is a section taken along line 6—6 of FIG. 5, FIGURE 7 is a fragmentary section taken along line 7—7 of FIG. 5, and FIGURE 8 is a section taken along line 8—8 of FIG. 6.

Referring to FIG. 1, the reference numeral 10 denotes generally a fluid type remote control device for shifting a transmission which includes an operator manipulated master control unit 12 that normally is mounted in the cab of the associated motor vehicle and a slave unit which is mounted on the housing 16 (see FIGS. 6 and 8) of the transmission with which device 10 is being used.

Referring now also to FIGS. 2, 3 and 4, the master control unit 12 will be described in detail. Control unit 12 includes a body 18 which is assembled from a lower portion 20, and intermediate portion 22 and an upper portion 24. Upper portion 24 has an annular opening 26 therein through which a dome-shaped member 28 protrudes.

Located in portions 20 and 22 of housing 18 are four bores 30, 32, 34 and 36 which are parallel to each other and are disposed equidistantly circumferentially of each other. One end of each bore opens into a fluid reservoir 38 defined by body portions 22 and 24 and in the other end of bores 30, 32, 34 and 36 there are located ports 40, 41, 43 and 45, respectively. The adjacent ends of body portions 20 and 22 are spaced apart slightly from each other due to a shoulder 42 on the adjacent end of body portion 20, thereby defining between the adjacent ends of body portions 20 and 22 a fluid passage 44 which places the bores in fluid communication with each other and also in fluid communication with a central fluid passage 46 which connects with reservoir 38.

A plurality of pistons 48, 50, 52 and 54 are disposed for reciprocal sliding movement in bores 30, 32, 34 and 36, respectively. The pistons 48, 50, 52 and 54 define with the bores in which they are disposed fluid chambers 56, 57, 58 and 59, respectively. Since all of the pistons are identical, only piston 48 will be described in detail. Extending inwardly of piston 48 from the end adjacent chamber 56 is a cavity 66. Communicating with cavity 66 is a plurality of slots or ports 68 cut in the side of piston 48. Extending inwardly of piston 48 from the end opposite cavity 66 is a bore 70 which has a reduced diameter portion 72 that extends through piston 48 to communicate with cavity 66. Disposed in bore 70 is an annular insert 74 with a seat portion 76. Insert 74 is held in place by means of a retainer or snap ring 78.

Located centrally of the pistons and bores is an upstanding tube 80 which is supported by means of another tube 82 that extends transversely through it and engages notches 84 in the upper end of body portion 22. Located at the top of tube 80 is a pair of notches 86 which receive the projections 88 on a plate 90 which is disposed in tube 80.

Engaging plate 90 is the spherical end 92 of a control lever 94 which passes through member 28. Extending outwardly from spherical end 92 is a rod 96 which engages notches 86 in tube 80. Rod 96 also engages notches 98 (FIG. 3) in the underside of member 28. At this point it will be seen that member 28 is supported for limited universal pivotal movement and at the same time is held from rotational movement about a vertical axis. A compression spring 100 is disposed within tube 80 between tube 82 and plate 90 and tends to bias member 28 into abutment with the edge of opening 26.

Each piston is connected to member 28 by means of a rod 102. The upper end of each rod has a portion of a sphere 104 connected thereto which engages the curved inner surface 106 of a ring 108 that is pressed into a bore 110 in the underside of member 28 so that each rod 102 is connected to member 28 for limited universal pivotal movement. Attached to the lower end of each rod 102 is a portion of a sphere 112 which normally abuts seat 76 and is held between seat 76 and retainer 78 so that spherical portion 112 may move away from seat 76 under certain operating conditions, but still remain connected to the associated piston through retainer 78.

At this point it will be seen that the pistons will be interconnected so that when they are disposed as shown in FIGS. 2 and 3 the chambers defined by the respective pistons and bores are in fluid communication through ports 68 and fluid passage 44. Further, movement of one of the pistons in one direction results in a substantially equal and opposite movement of the opposite piston.

Slave unit 14 includes a body 114 to which a pair of double-acting piston and cylinder type fluid motors 116 and 118 are connected. Fluid motors 116 and 118 actuate a selector finger 120 which in turn shifts an associated transmission.

Fluid motor 116 includes a piston 124 which is slidably disposed in a cylinder 122, cylinder 122 being connected to body 114. Piston 124 divides cylinder 122 into a pair of chambers 126 and 128 with which a pair of ports 130 and 132 communicate, respectively. Connected to piston 124 is a piston rod 134 whch extends across body 114 and to which selector finger 120 is connected, being held in place by means of a set screw 136 (FIG. 7).

Fluid motor 118 includes a cylinder 138 connected to body 114 and a piston 40 slidably disposed in cylinder 138. Piston 140 divides cylinder 138 into a pair of chambers 142 and 144 with which a pair of ports 146 and 148 communicate, respectively. Connected to piston 140 is a piston rod 150. Connected to rod 150 is an arm 152 which carries a rod 154 that engages a slot 156 in selector finger 120.

A detent mechanism 150 is provided to releasably hold arm 152 in a predetermined position and includes a notch 160 which is engaged by a ball 162 that is resiliently biased into abutment with it by means of a compression spring 164 that is disposed in a tube 166 in body 114.

The chambers of fluid motors 116 and 118 are connected with the chambers of master control unit 12 by means of fluid conduits. That is, chamber 56 is in fluid communication with chamber 128 via fluid conduit 168, chamber 58 is in fluid communicaton with chamber 126 via a fluid conduit 170, chamber 57 is in fluid communication with chamber 144 via a fluid conduit 172 and chamber 59 is in fluid communication with chamber 142 via a fluid conduit 174.

Slave unit 14 is intended, for example, to be mounted on the housing of a transmission so that selector finger 120 may selectively engage one of notches 176, 178 or 180 located in shift forks 182, 184 and 186, respectively. Shift fork 182 is connected to a shift rail 188 which is journaled for reciprocal sliding movement in a rail support 190. Similarly, shift fork 184 is connected to a slidable shift rail 192 and shift work 186 is connected to a slidable shift rail 194. Each of the shift forks engages either a slidable gear or part of a clutch, depending upon whether the transmission is of the sliding gear type or constant mesh gear type. It is immaterial to the operation of my invention with which of the above two types of transmission it is used. It is only necessary to note that movement of the shift fork in one direction from a neutral position engages one set of gears and movement of the shift fork in the other direction from the neutral position engages another set of gears.

In order to hold the shift forks in either of the shift positions, and to aid the operator in determining when the shift fork is in a shifted or neutral position, there are provided detent mechanisms 196, 198 and 200 which cooperate with shift rails 188, 192 and 194, respectively. Each detent mechanism includes three notches 202, 204 and 206 in the associated shift rail and a ball 200 which is biased into engagement with one of the notches at a time by a compression spring 210.

In order to enable persons skilled in the art to better understand my invention, I will now explain the operation of it in a preferred embodiment thereof. It will be assumed that master control 12 is mounted in the cab of a truck and that slave unit 14 is mounted on the housing 16 of a transmission of either the sliding gear type or the constant mesh gear type or a combination of the two, so that selector finger 120 can engage selectively one of notches 176, 178 or 180 in the associated shift forks.

Assuming that selector finger 120 is disposed in the neutral position engaging slot 178 of shift rail 184, as shown in FIGS .6 and 8, the operator can manipulate control lever 94 to shift work 184 toward the left, as viewed in FIG. 6, until ball 208 engages notch 206. In order to shift work 184 toward the left control lever 94 is actuated to move piston 48 downwardly to force fluid out of chamber 56 and hence force fluid into chamber 128 while at the same time moving piston 52 upwardly to allow fluid being forced out of chamber 126 to fiill chamber 58. As a result piston 134 is shifted toward the left, as viewed in FIGS. 5 and 6, and hence selector finger 120 is likewise shifted toward the left, thereby actuating fork 184 toward the left. In order to shift fork 184 toward the right, as viewed in FIG. 6, control lever 94 is manipulated to cause piston 52 to move downwardily so that fluid is forced out of chamber 58 and into chamber 126 while at the same time piston 48 is moving upwardly thus permitting fluid to be forced out of chamber 128 and into chamber 56. As a result, piston rod 134 will shift toward the right, and hence selector finger will shift toward the right thereby actuating shift fork 184 toward the right. Similarly, shift forks 182 or 186 can be shifted to the left or right, as viewed in FIGS. 6 and 8, by having selector finger 120 engage the notch of whichever fork it is desired to shift, and then actuating rod 134 toward the desired leftward or rightward direction as described hereinabove.

In order to move selector finger 120 between notches 176, 178 and 180 control lever 94 is manpulated by the operator so that one or the other of pistons 50 and 54 is moved downwardly while the other is moved upwardly, thereby forcing fluid into or out of chambers 142 and 144, as desired, to cause rod 150 to move either upwardly or downwardly, as viewed in FIG. 5. In the present embodiment manipulation of control lever 94 to cause piston 50 to move downwardly so that fluid is forced out of chamber 57 causes fluid to be forced into chamber 144 with the result that rod 150 is moved upwardly. Conversely, movement of piston 54 downwardly so that fluid is forced out of chamber 59 forces fluid into chamber 142 so that rod 150 is caused to move downwardly, as shown in FIG. 5.

The mechanism for actuating selector finger 120 to shift the associated transmission utilizes six pistons. Inevitably, there is some leakage of fluid past the sides of these pistons. As a result, unless there is some provision for correcting the leakage of fluid past the pistons, the position of selector arm 120 relative to a given position of control lever 94 will slowly change. Thus, when control lever 94 is disposed in the centered position shown in FIG. 2, and there has been some leakage of fluid past piston 124 or past one of pistons 48 or 52 or all three of them, selector arm 120 will not be disposed as shown in FIG. 6. Rather, it will be shifted slightly one direction or the other so that ball 208 of detent mechanism 198 is partially up one side or the other of notch 204. However, because fluid passage 44 connects bores 30 and 34 and in the centered position of control lever 94 ports 68 in pistons 48 and 52 register with fluid passage 44, the chambers 56 and 58 are placed in fluid communication. Consequently, the force exerted on ball 208 by spring 210 of detent mechanism 198 causes rail 192 to shift one direction or the other until ball 208 is fully seated in notch 204. This slight movement of rail 192 causes a corresponding slight movement of selector finger 120 which results in fluid being forced out of either chamber 126 or chamber 128, depending on which direction selector finger 120 is moved. Similarly, if there is a slight leakage of fluid past pistons 50, 54 or 140 so that selector finger 120 is moved slightly away from the centered position shown in FIG. 8 when control lever 94 is disposed in the centered position, there is a fluid communication between chambers 57 and 59 via the ports in pistons 50 and 54 and the fluid passage 44 so that the force of spring 160 on ball 162 of detent mechanism 158 causes arm 152 to move in one direction or the other until ball 162 is fully seated in notch 160.

In view of the foregoing description it will be apparent that whenever control lever 94 is disposed so that the ports in the pistons opposite each other are in register with fluid passage 44 that the fluid chambers on opposite sides of pistons 124 and 140 are placed in fluid communication so that in the event selector finger 120 has gotten slightly out of phase with control lever 94 that the associated detent mechanism can bring selector finger 120 back into the full neutral position and again in phase with control lever 94.

An advantage of my invention is that in case one of the pistons of control unit 12 is prevented from moving upwardly while the piston opposite it is moving downwardly the spherical portion 112 associated with the piston which should be moving upwardly moves away from its respective seat 76, thereby placing fluid in reservoir 38 in communication with the chamber defined by the piston so that no vacuum is created behind the piston.

The above-detailed description is intended to be illustrative only, and it should be understood that my invention has application to mechanisms other than transmissions. Further, various modifications and changes will occur to others skilled in the art which will fall in the scope and spirit of my invention. Consequently, the limits of my invention should be determined from the following claims.

I claim:

1. A device having a body, first and second bores in the said body, first and second pistons slidably disposed in the said first and second bores, respectively, the said first piston defining with the said first bore a first chamber and the said second piston defining with the said second bore a second chamber, wherein the improvement comprises first fluid passage means connecting the said bores, a first port in the side of the said first piston, second fluid passage means in the said first piston which connects the said port with the said first chamber, a second port in the side of the said second piston, third fluid passage means in the said second piston which connects the said second port with the said second chamber, means interconnecting the said pistons so that the said ports communicate simultaneously with the said first fluid passage means and movement of one of the said pistons in one direction causes a movement in the opposite direction of the other piston, the said interconnecting means including first and second rods pivotally connected to the said first and second pistons, respectively, and a rigid member which is mounted for pivotal movement relative to the said body and to which the said rods are pivotally connected, each pivotal connection between a rod and the respective piston including a seat on the respective piston, at least a portion of a sphere connected to the rod, the said portion normally abutting the said seat in fluid sealing relation, and a retainer connected to the respective piston which allows limited movement of the said portion away from the said seat, and fluid passage means in the respective piston connecting the ends of the respective piston and disposed so that fluid communication therethrough is controlled by the cooperation of the said seat and portion.

2. A device as set forth in claim 1 and including a fluid reservoir communicating with the said bores and the said first fluid passage means.

References Cited

UNITED STATES PATENTS

| | | | |
|---|---|---|---|
| 1,610,580 | 12/1926 | Nicholson | 60—54.5 |
| 2,014,195 | 9/1935 | McCollum | 60—54.5 |
| 2,181,754 | 11/1939 | White | 60—54.5 |
| 2,737,021 | 3/1956 | Edge et al. | 60—54.5 |

MARTIN P. SCHWADRON, *Primary Examiner.*

ROBERT R. BUNEVICH, *Assistant Examiner.*

U.S. Cl. X.R.

60— 54.6